United States Patent
Matusik et al.

(10) Patent No.: US 6,831,641 B2
(45) Date of Patent: *Dec. 14, 2004

(54) MODELING AND RENDERING OF SURFACE REFLECTANCE FIELDS OF 3D OBJECTS

(75) Inventors: Wojciech Matusik, Arlington, MA (US); Hanspeter Pfister, Arlington, MA (US); Wai Kit Addy Ngan, Cambridge, MA (US); Leonard McMillan, Jr., Newton, MA (US); Remo Ziegler, Cambridge, MA (US)

(73) Assignee: Mitsubishi Electric Research Labs, Inc., Cambridge, MA (US)

(*) Notice: Subject to any disclaimer, the term of this patent is extended or adjusted under 35 U.S.C. 154(b) by 277 days.

This patent is subject to a terminal disclaimer.

(21) Appl. No.: 10/172,967

(22) Filed: Jun. 17, 2002

(65) Prior Publication Data

US 2003/0231174 A1 Dec. 18, 2003

(51) Int. Cl.[7] ............................................... G06T 15/50
(52) U.S. Cl. ...................... 345/420; 345/426; 345/427
(58) Field of Search ................................ 345/419, 427, 345/420, 646, 426; 250/208.1; 356/613; 382/103, 181; 348/169, 44; 700/57–59; 89/41.06, 41.19; 359/683, 697, 820

(56) References Cited

U.S. PATENT DOCUMENTS

| | | | | |
|---|---|---|---|---|
| 4,941,041 A | * | 7/1990 | Kenyon | 348/44 |
| 6,079,862 A | * | 6/2000 | Kawashima et al. | 382/103 |
| 6,455,835 B1 | * | 9/2002 | Bernardini et al. | 250/208.1 |
| 6,515,658 B1 | * | 2/2003 | Endoh | 345/419 |
| 6,597,368 B1 | * | 7/2003 | Arai et al. | 345/646 |

* cited by examiner

Primary Examiner—Mark Zimmerman
Assistant Examiner—Lance W. Sealey
(74) Attorney, Agent, or Firm—Dirk Brinkman; Andrew J. Curtin

(57) ABSTRACT

A method models a three-dimensional object by first acquiring alpha mattes of the object for multiple viewpoints. The alpha mattes are then projected onto a surface hull completely enclosing the object to construct an opacity hull storing opacity values of the surface of the object. The object is illuminated for various lighting conditions while images are acquired. The images are projected onto the opacity hull to render the object under arbitrary lighting conditions for arbitrary viewpoints.

7 Claims, 7 Drawing Sheets

MODELING AND RENDERING OF SURFACE REFLECTANCE FIELDS OF 3D OBJECTS

FIELD OF THE INVENTION

The invention relates generally to computer graphics, and more particularly to acquiring images of three-dimensional physical objects to generate 3D computer graphics models that can be rendered in realistic scenes using the acquired images.

BACKGROUND OF THE INVENTION

Three-dimensional computer graphics models are used in many computer graphics applications. Generating 3D models manually is time consuming, and causes a bottleneck for many practical applications. Besides the difficulty of modeling complex shapes, it is often impossible to replicate the geometry and appearance of complex objects using prior art parametric reflectance models.

Not surprisingly, systems for generating 3D models automatically by scanning or imaging physical objects have greatly increased in significance. An ideal system would acquire the shape and appearance of an object automatically, and construct a detailed 3D model that can be placed in an arbitrary realistic scene with arbitrary novel illumination.

Although there has been much recent work towards this goal, no system to date fulfills all of these requirements. Many systems, including most commercial systems, focus on capturing accurate shape, but neglect to acquire an accurate appearance. Other methods capture reflectance properties of 3D objects and fit these properties to parametric bi-directional reflectance distribution functions (BRDFs). However, those methods fail for complex anisotropic BRDFs and do not model important appearance effects, such as inter-reflections, self-shadowing, translucency, sub-surface light scattering, or refraction.

There have also been a number of image-based methods for acquiring and representing complex objects. But they either lack a 3D shape model, assume accurate 3D geometry, do not allow rendering the objects under novel arbitrary illumination, or are restricted to a single viewpoint. All of these systems require substantial manual involvement.

There are many methods for acquiring high-quality 3D shape from physical objects, including contact digitizers, passive stereo depth-extraction, and active light imaging systems. Passive digitizers are inadequate where the object being digitized does not have sufficient texture. Nearly all passive methods assume that the BRDF is Lambertian, or does not vary across the surface.

Magda et al., in "Beyond Lambert: Re-constructing Surfaces with Arbitrary BRDFs." *Proc. of IEEE International Conference on Computer Vision ICCV,* 2001, described a stereopsis method that uses the Helmholtz reciprocity to extract depth maps from objects with arbitrary BRDFs. However, their method is not robust for smooth objects. In addition, their method does not take inter-reflections and self-shadowing into account.

Active light systems, such as laser range scanners, are very popular and have been employed to acquire large models in the field, see Levoy et al. "The Digital Michelangelo Project: 3D Scanning of Large Statues," *Computer Graphics,* SIGGRAPH 2000 Proceedings, pp. 131–144, 2000, and Rushmeier et al. "Acquiring Input for Rendering at Appropriate Levels of Detail: Digitizing a Pietà," *Proceedings of the 9th Eurographics Workshop on Rendering,* pp. 81–92, 1998.

Active light systems often require a registration step to align separately acquired scanned meshes, see Curless et al., "A Volumetric Method for Building Complex Models from Range Images," *Computer Graphics,* SIGGRAPH 96 Proceedings, pp. 303–312, 1996, and Turk et al., "Zippered Polygon Meshes from Range Images," *Computer Graphics,* SIGGRAPH 94 Proceedings, pp. 311–318, 1994. Alternatively, the scanned geometry is aligned with separately acquired texture images, see Bernardini et al., "High-Quality Texture Reconstruction from Multiple Scans," *IEEE Trans. on Vis. and Comp. Graph.,* 7(4):318–332, 2001.

Often, filling of gaps due to missing data is necessary as well. Systems have been constructed where multiple lasers are used to acquire a surface color estimate along lines-of-sight of the imaging system. However, those systems are not useful for capturing objects under realistic illumination. All active light systems place restrictions on the types of materials that can be scanned, as described in detail by Hawkins et al., in "A Photometric Approach to Digitizing Cultural Artifacts," *2nd International Symposium on Virtual Reality, Archaeology, and Cultural Heritage,* 2001.

To render objects constructed of arbitrary materials, image-based rendering can be used. Image-based representations have the advantage of capturing and representing an object regardless of the complexity of its geometry and appearance. Prior art image-based methods allowed for navigation within a scene using correspondence information, see Chen et al., "View Interpolation for Image Synthesis," *Computer Graphics,* SIGGRAPH 93 Proceedings, pp. 279-288, 1993, and McMillan et al., "Plenoptic Modeling: An Image-Based Rendering System," *Computer Graphics,* SIGGRAPH 95 Proceedings, pp. 39–63 46, 1995. Because this method does not construct a model of the 3D object, it is severely limited.

Light field methods achieve similar results without geometric information, but with an increased number of images, see Gortler et al, "The Lumigraph," *Computer Graphics,* SIGGRAPH 96 Proceedings, pp. 43–54, 1996, and Levoy et al., "Light Field Rendering," *Computer Graphics,* SIGGRAPH 96 Proceedings, pp. 31–42, 1996. The best of those methods, as described by Gortler et al., include a visual hull of the object for improved ray interpolation. However, those methods use static illumination, and cannot accurately render objects into novel arbitrary realistic scenes.

An intermediate between purely model-based and purely image-based methods uses view-dependent texture mapping, see Debevec et al., "Modeling and Rendering Architecture from Photographs: A Hybrid Geometry- and Image-Based Approach," *Computer Graphics,* SIGGRAPH 96 Proceedings, pp. 11–20, 1996, Debevec et al., "Efficient View-Dependent Image-Based Rendering with Projective Texture-Mapping," *Proceedings of the 9th Eurographics Workshop on Rendering,* pp.105–116, 1998, and Pulli et al., "View-Based Rendering: Visualizing Real Objects from Scanned Range and Color Data," *Eurographics Rendering Workshop* 1997, pp. 23–34, 1997. They combine simple geometry and sparse texture data to accurately interpolate between images. Those methods are effective despite their approximate 3D shapes, but they have limitations for highly specular surfaces due to the relatively small number of texture maps.

Surface light fields can be viewed as a more general and more efficient representation of view-dependent texture maps, see Nishino et al., "Eigen-Texture Method: Appearance Compression based on 3D Model," *Proc. of Computer Vision and Pattern Recognition,* pp. 618–624, 1999, Miller et al., "Lazy Decompression of Surface Light Fields for Precomputed Global Illumination," *Proceedings of the 9th Eurographics Workshop on Rendering,* pp. 281–292, 1998, Nishino et al., "Appearance Compression and Synthesis based on 3D Model for Mixed Reality," *Proceedings of IEEE ICCV '99,* pp. 3845, 1999, Grzeszczuk, "Acquisition and Visualization of Surface Light Fields," *Course Notes, SIGGRAPH 2001*, 2001, and Wood et al., "Surface Light Fields for 3D Photography," *Computer Graphics, SIGGRAPH 2000 Proceedings*, pp. 287–296, 2000. Wood et al. store surface light field data on accurate high-density geometry, whereas Nishino et al. use a coarser triangular mesh for objects with low geometric complexity.

Surface light fields are capable of reproducing important global lighting effects, such as inter-reflections and self-shadowing. Images generated with a surface light field usually show the object under a fixed lighting condition. To overcome this limitation, inverse rendering methods estimate the surface BRDF from images and geometry of the object.

To achieve a compact BRDF representation, most methods fit a parametric reflection model to the image data, see Lensch et al., "Image-Based Reconstruction of Spatially Varying Materials," *Proceedings of the 12th Eurographics Workshop on Rendering*, 2001, Sato et al.," Object Shape and Reflectance Modeling from Observation," *Computer Graphics*, SIGGRAPH 97 Proceedings, pp. 379–387, 1997, and Yu et al., "Inverse Global Illumination: Re-covering Reflectance Models of Real Scenes from Photographs," *Computer Graphics*, SIGGRAPH 99 Proceedings, pp. 215–224, 1999.

Sato et al. and Yu et al. assume that the specular part of the BRDF is constant over large regions of the object, while the diffuse component varies more rapidly. Lensch et al. fit a Lafortune BRDF model to each point on the object surface. Simple parametric BRDFs, however, are incapable of representing the wide range of reflections seen in real scenes. As described by Hawkins et al., objects featuring glass, fur, hair, cloth, leaves, or feathers are very challenging or impossible to represent this way.

An alternative method uses image-based, non-parametric representations for object reflectance, see Marschner et al., "Image-based BRDF Measurement Including Human Skin," *Proceedings of the 10th Eurographics Workshop on Rendering*, pp. 139–152, 1999. They use a tabular BRDF representation and measure the reflectance properties of convex objects using a digital camera. Their method is restricted to objects with a uniform BRDF, and they incur problems with geometric errors introduced by 3D range scanners. Image-based relighting can also be applied to real human faces by assuming that the surface reflectance is Lambertian, see Georghiades et al., "Illumination-Based Image Synthesis: Creating Novel Images of Human Faces under Differing Pose and Lighting," *IEEE Workshop on Multi-View Modeling and Analysis of Visual Scenes*, pp. 47–54, 1999.

More recent approaches use image databases to re-light models of objects from a fixed viewpoint without acquiring a full BRDF, see Debevec et al., "Acquiring the Reflectance Field of a Human Face," *Computer Graphics, SIGGRAPH 2000 Proceedings*, pp. 145–156, 2000, Hawkins et al., "A Photometric Approach to Digitizing Cultural Artifacts," *2nd International Symposium on Virtual Reality, Archaeology, and Cultural Heritage*, 2001, Koudelka et al., "Image-based Modeling and Rendering of Surfaces with Arbitrary BRDFs, "*Proc. of Computer Vision and Pattern Recognition*, 2001, and Malzbender et al., "Polynomial Texture Maps, *Computer Graphics*, SIGGRAPH 2001 Proceedings, pp. 519–528, 2001.

They use a light stage with fixed camera positions and a rotating light to acquire the reflectance field of a human face, or of cultural artifacts. The polynomial texture map system described by Malzbender et al. uses a similar technique for objects with approximately planar geometry and diffuse reflectance properties. Koudelka et al. use essentially the same method as Debevec et al. to render objects with arbitrary BRDFs. Those reflectance field approaches are limited to renderings from a single viewpoint. In Debevec et al., a parametric model of skin reflectance is fit to the data to synthesize views from arbitrary directions. As described by Kaudelka et al., that approach does not generalize to complex materials.

In the prior art, a surface reflectance field of an object is defined as the radiant light from a surface under every possible incident field of illumination. It is important to note that, despite the word reflectance, the surface reflectance field captures all possible surface and lighting effects, including surface texture or appearance, refraction, dispersion, subsurface scattering, and non-uniform material variations.

Zongker et al. describe techniques of environment matting to capture mirror-like and transparent objects, and to correctly composite them over arbitrary backgrounds, see Zongker et al., "Environment Matting and Compositing. In *Computer Graphics*, SIGGRAPH 1999 Proceedings, pp. 205–214, August 1999. Their system is able to determine the direction and spread of the reflected and refracted rays by illuminating a shiny or refractive object with a set of coded light patterns. They parameterize surface reflectance into 2D environment mattes. Extensions to environment matting include a more accurate capturing method and a simplified and less accurate procedure for real time capture of moving objects. However, their system only captures environment mattes for a fixed viewpoint, and they do not reconstruct the 3D shape of the object.

Therefore, it is desired to automatically generate computer graphics models from objects made of arbitrary materials under various lighting conditions, so that the models can be rendered in realistic scenes with arbitrary lighting.

SUMMARY OF THE INVENTION

The invention provides a system and method for acquiring and rendering high quality graphical models of physical objects, including objects constructed of highly specular, transparent, or fuzzy materials, such as fur and feathers, that are difficult to handle with traditional scanners. The system includes a turntable, an array of digital cameras, a rotating array of directional lights, and multi-color backlights. The system uses the same set of acquired images to both construct a model of the object, and to render the object for arbitrary lighting and points of view.

The system uses multi-background matting techniques to acquire alpha mattes of 3D objects from multiple viewpoints by placing the objects on the turntable. The alpha mattes are used to construct an opacity hull. An opacity hull is a novel shape model with view-dependent opacity parameterization of the surface hull of the object. The opacity hull enables rendering of complex object silhouettes and seamless blending of objects into arbitrary realistic scenes.

Computer graphics models, according to the invention, are constructed by acquiring radiance, reflection, and refraction images. During rendering, the models can also be lighted from arbitrary directions using a surface reflectance field, to produce a purely image-based appearance representation. The system is unique in that it acquires and renders surface appearance under varying illumination from arbitrary viewpoints. The system is fully automatic, easy to use, has a simple set-up and calibration. The models acquired from objects can be accurately composited into synthetic scenes.

DETAILED DESCRIPTION OF THE PREFERRED EMBODIMENT

System Structure

Figure 1:
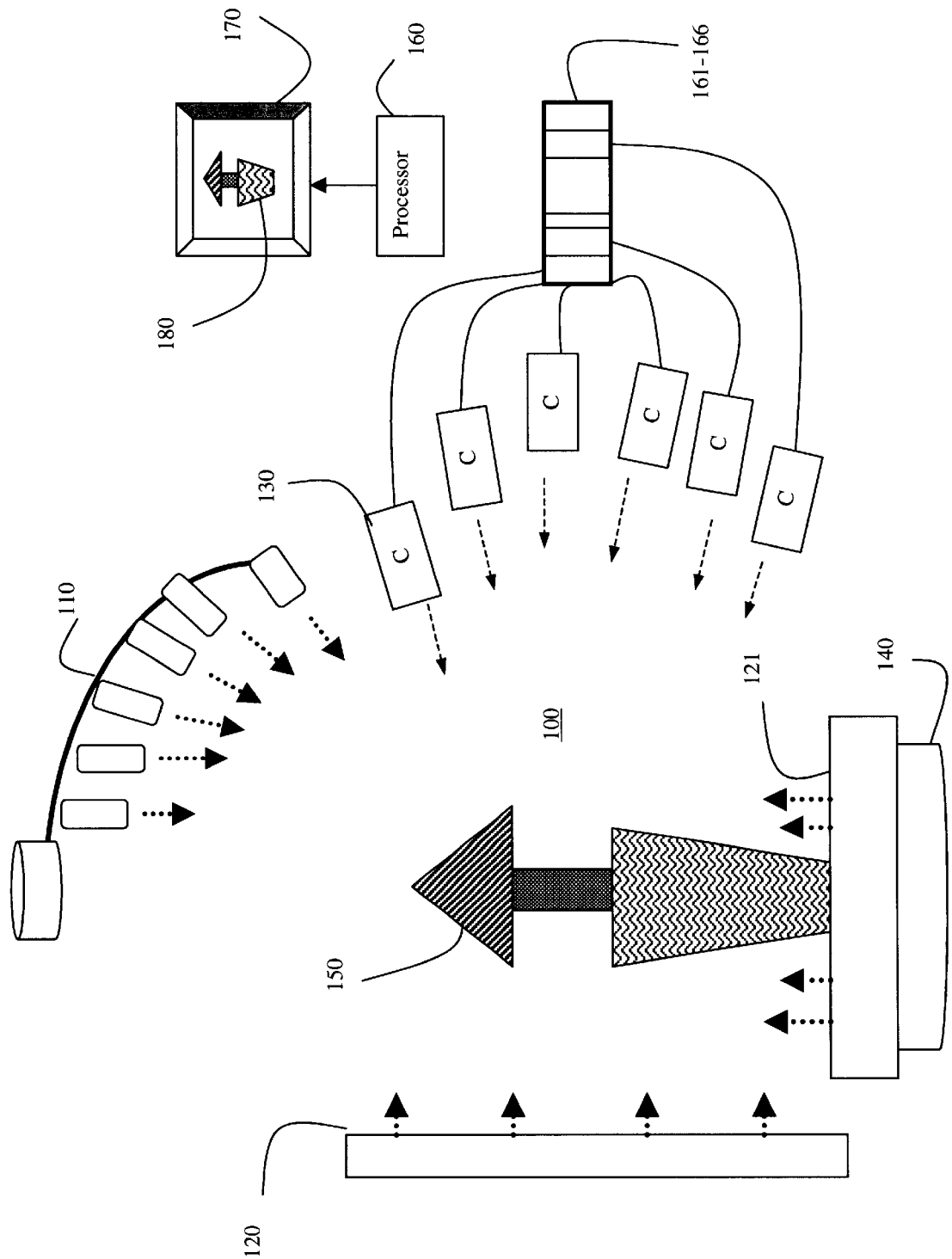
FIG. 1 is diagram of the system according to the invention.

FIG. 1 shows a system 100 for modeling and rendering a 3D object 150 according to the invention. The system 100 includes an array of directional overhead lights 110, a multi-color backlight 120 and a multi-color bottomlight 121, cameras 130, and a turntable 140. The output of the cameras 130, i.e., sets of images 161–166, is connected to a processor 160. The processor 160 can be connected to an output device 170 for rendering an acquired model 180 into arbitrary realistic scenes. It should be noted that either the cameras 130 or turntable can be rotated 140 to image the object from multiple viewpoints. The rotation provides coherence of sampled surface points.

The array of overhead lights 110 can be rotated. The lights are spaced roughly equally along elevation angles of a hemisphere. During object imaging, the overhead lights can be fixed, rotate around an object for a fixed point of view, or made to rotate with the object. The light array 110 can hold four, six, or more directional light sources. Each light uses a 32 Watt HMI Halogen lamp and a light collimator to approximate a directional light source at infinity. The overhead lights are controlled by an electronic light switch and dimmers. The dimmers are set so that the camera's image sensor is not saturated for viewpoints where the overhead lights are directly visible by the cameras. The lights can be controlled individually.

The multi-color backlight and bottomlight 120–121, in combination "backlights," are in the form of large-screen, high-resolution, plasma color monitors that can illuminate the object with light of any selected color. The two plasma monitors have a resolution of 1024×768 pixels. We light individual pixels to different colors as described below.

We use six QImaging QICAM cameras with 1360×1036 pixel color CCD imaging sensors. The cameras 130 are capable to acquire full resolution RGB images at eleven frames per second. The cameras are photometrically calibrated, see U.S. patent application Ser. No. 10/128,827 filed by Beardsley on Apr. 24, 2000 entitled "Calibration of Multiple Cameras for a Turntable-Based 3D scanner," incorporated herein by reference.

The cameras 130 are connected via a FireWire link to the processor 160, which is a 700 MHz Pentium III PC with 512 MB of RAM. We alternatively use 15 mm or 8 mm C mount lenses, depending on the size of the acquired object. The cameras 130 are also spaced equally along elevation angles of a hemisphere generally directed at the backlights, so that the object is in a foreground between the cameras and the backlights. To facilitate consistent backlighting, we mount the cameras roughly in the same vertical plane directly opposite the backlight 120.

The object 150 to be digitized, modeled, and rendered is placed on the bottomlight 121, which rests on the turntable 140. The cameras 130 are pointed at the object from various angles (viewpoints). To facilitate consistent backlighting, we mount the cameras roughly in the same vertical plane as the backlight 120. The backlight 120 is placed opposite the cameras and illuminate the object substantially from behind, as viewed by the cameras. The bottomlight is placed beneath the object 150.

System Operation

Figure 2:
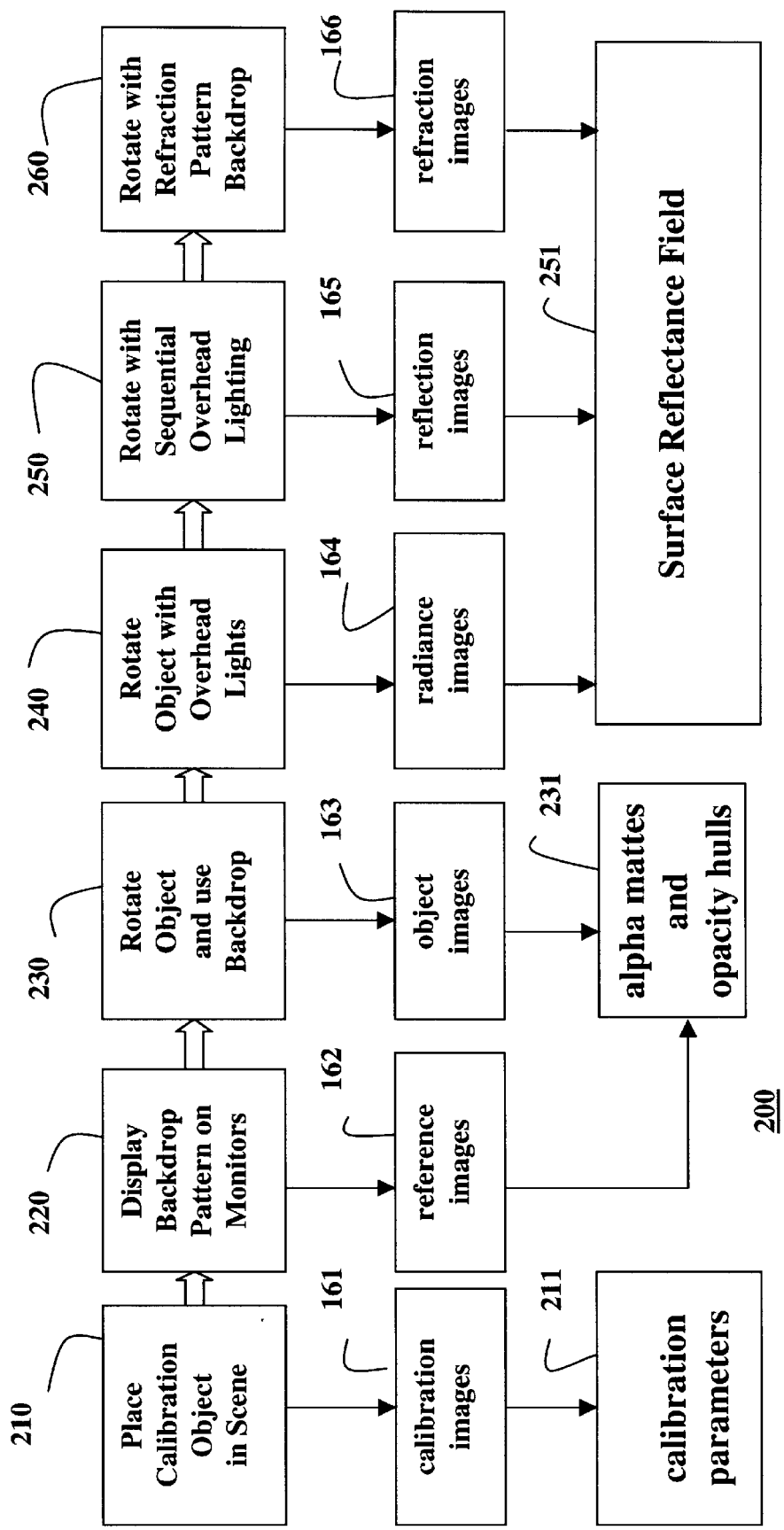
FIG. 2 is a flow diagram of a method for acquiring images used by the invention.

As shown in FIG. 2, our 3D digitizing system 100 combines both active and passive imaging processes 200 during operation. The object 150 is rotated on the turntable while sets of images 161–166 are acquired. The rotation can be in ten degree steps so that the object is imaged from 6×36 different viewpoints, or the turntable positions can be user specified. The angular positions of the turntable are repeatable so that all images are registered with each other using acquired calibration parameters 211.

During operation of the system, the cameras 130 acquire up to six sets of images 161–166, i.e., calibration images 161, reference images 162, object images 163, radiance images 164, reflection images 165, and refraction images 166, respectively. The order of acquisition is not important, although the processing of the images should be in the order as indicated. Calibration only needs to be performed once in a pre-processing step for a particular arrangement of the turntable and cameras. The acquisition and processing of the images can be fully automated after the object has been placed on the turntable. In other words, the model 180 is acquired completely automatically.

The set of calibration images 161 is acquired of a calibration object decorated with a known calibration pattern. The set of reference images 162 is acquired while a backdrop pattern is displayed on the monitors 120–121 without the foreground object 150 in the scene. The set of object images 163 is acquired while the object 150 is illuminated by the backlight and bottomlight to construct alpha mattes. The sets of radiance, reflection, and refraction images 164–166 are used to construct a surface reflectance field 251, as described in greater detail below. We use the traditional definition of surface reflectance fields, which models the radiant light from an object surface under every possible incident field of illumination.

We acquire images in a high dynamic range by acquiring four frames. For all objects, we acquire two object images for alpha matting from each viewpoint. We acquire one radiance image from each viewpoint for a total of 6×36×4× (2+1)=2592 images. We acquire reflection images using 4×15 light directions from each viewpoint for a total of 6×36×4×(60+2)=53568 images. The refraction images are acquired using eighteen structured background images from each viewpoint for a total of 6×36×4×(18+2)=17280 images. It should be noted that other numbers of images from various viewpoints can be used.

A key difference with the prior art is that our system uses multi-color back- and bottomlights for alpha matte extraction for multiple viewpoints and for the construction of an opacity hull according to the invention. As described below, the availability of approximate geometry and view-dependent alpha mattes greatly extends the different types of objects that an be modeled. Another key difference with the prior art is that our system uses a combination of rotating overhead lights, backlights, and a turntable to acquire a surface reflectance field of the object from multiple viewpoints.

It should be noted that other equivalent systems can be built. For example, instead of using a turntable, the cameras can be rotated around the object, and multiple plasma monitors can be placed around the object. and the alpha mattes can be acquired using traditional passive computer vision techniques.

Image Acquisition Process

High Dynamic Range Images

Our images 161–162 are acquired using a high dynamic range (HDR) technique. Because raw output from the cameras 130 is available, the relationship between exposure time and radiance values is linear over most of the operating range. For each viewpoint, we take four frames with exponentially increasing exposure times and use a least squares linear fit to determine this response line. Our HDR imager has ten bits of precision. Therefore, when we use the term "image," we mean an HDR image that is constructed from four individual dynamic range frames.

Due to non-linear saturation effects at the extreme ends of the scale, we only use intensity values in the range of five to a thousand in our least squares fit. We can ignore the DC offsets due to thermal and fixed pattern noise of the CCDs of the cameras, which is negligible for our cameras 130. Therefore, we store only the slope of the response line as one floating point number per pixel. This image representation has the flexibility of specifying the desired exposure time of the images at viewing time.

Calibration Images

The image acquisition sequence 200 starts by placing a calibration object onto the turntable 140 and, if necessary, adjusting the position and aperture of the cameras 130. We acquire 210 the set of calibration images 161 of a known calibration object, e.g., a cube with a known pattern. A 36-image sequence of the rotated calibration target is taken from each of the cameras. Intrinsic and extrinsic camera parameters 211 are determined using a calibration procedure for turntable systems with multiple cameras.

Reference Images

Next, we acquire 220 the set of reference images 162 of patterned backdrops used for multi-color alpha matting. For each viewpoint, each patterned backdrop is photographed alone without the object 150 in the foreground. Reference images only have to be acquired once after calibration. They are stored and used for subsequent object modeling.

Object Images

The object 150 is then put on the turntable 140, and the set of object images 163 is acquired 230 while both plasma monitors 120–121 illuminate the object 150 from below and behind with the patterned backdrops, while the turntable 140 goes through a first rotation. The reference image 162 and object images 163 are used to determine the alpha mattes and the opacity hull as described below. As described below, we acquire the reference and object images using one ore more out-of-phase colored backdrops.

Radiance Images

The set of radiance images 164 are acquired 240 using just the array overhead directional lights 110. The directional lights 110 can be fixed or made to rotate with the object. Coupled rotation leads to greater coherence of radiance samples for each surface point, because view-dependent effects, such as highlights, remain at the same position on the surface. One or more lights can be used. We obtain the best results when additional ambient light is used to avoid dark shadows and high contrast in the set of radiance images 164. We avoid specular reflections, by covering all equipment in the scene with a black non-reflective material, e.g., black felt drop-cloths. The radiance images are used to construct the surface reflectance field 251, which can be used during rendering.

Reflection Images

If we want to arbitrarily illuminate the model generated from the object during rendering, then we can acquire 250 the set of reflection images 165 to construct a surface reflectance field 251. To avoid specular reflections, we the display surface with black felt without upsetting the object position. We only rotate the lights 110 to cover a sector '$\Omega_l$, described in greater detail below with reference to FIG. 5b. The array of lights 110 is rotated around the object 150 while the object remains in a fixed position. For each rotation position, each light along the elevation of the light array is turned on sequentially and an image is captured with each camera. We use four lights and typically increment the rotation angle by 24 degrees for a total of 4×15 images for each camera position. This procedure is repeated for all viewpoints. The reflection images 165 are used to construct the low resolution surface reflectance field 251 as described below.

Refraction Images

We can also optionally acquire 260 the set of refraction images 166 to make the surface reflectance field 251 high resolution. The acquisition process involves taking multiple images of the foreground object in front of a backdrop with a 1D Gaussian profile that is swept over time in horizontal, vertical, and diagonal direction of the plasma monitors. Using the non-linear optimization procedure, we then solve for a and the parameters of the 2D Gaussians G.

To save storage and computation time for the non-linear parameter estimation, we identify and remove areas outside the object silhouette. The environment matte is subdivided into 8×8 pixel blocks. Each surface point on the opacity hull that is visible from this view is projected into the image. Only those blocks that contain at least one back-projected surface point are stored and processed.

For certain positions in the camera array, the rim of the plasma monitors is visible through transparent object, which makes much of the field of view unusable. Consequently, we only use the lower and the two upper most cameras for acquisition of environment mattes. The lower camera is positioned horizontally, directly in front of the background monitor. The two upper cameras are positioned above the monitor on the turntable. Then using our environment matte interpolation as described below, we can render plausible results for any viewpoint.

Bi-Directional Sub-Surface Reflectance Distribution Fields of 3D Models

Using the images 161–166, we develop an approximate bi-directional sub-surface reflectance distribution field (BSSRDF) model for how light scatters at the surface of the object 150. Our model is different from prior art BSSRDF models, see Chuang below, in that our model is developed from multiple views with multiple cameras 130, see FIG. 1, instead of from a single view with a single camera. Other differences with prior art BSSRDF are noted below.

Using classical physics, and assuming that the incident radiation originates infinitely far away from the object's surface, the light arriving at each camera pixel can be described as:

$$C = \int_\Omega W(\omega_i) E(\omega_i) d\omega.$$

The value C is the recorded color value at each camera pixel, E is the environment illumination from a direction $\omega_i$, W is a weighting function that comprises all means of light transport from the environment through the foreground object 150 to the cameras 130. The integration is carried out over the entire hemisphere '$\Omega$, and for each wavelength. Hereinafter, all equations are evaluated separately for the R, G, and B color channels to reflect this wavelength dependency.

Given a measured camera intensity C at a pixel and an environment E, we want to approximate the function W for the point on the object surface corresponding to the ray through that pixel.

Figures 5A, 5B:
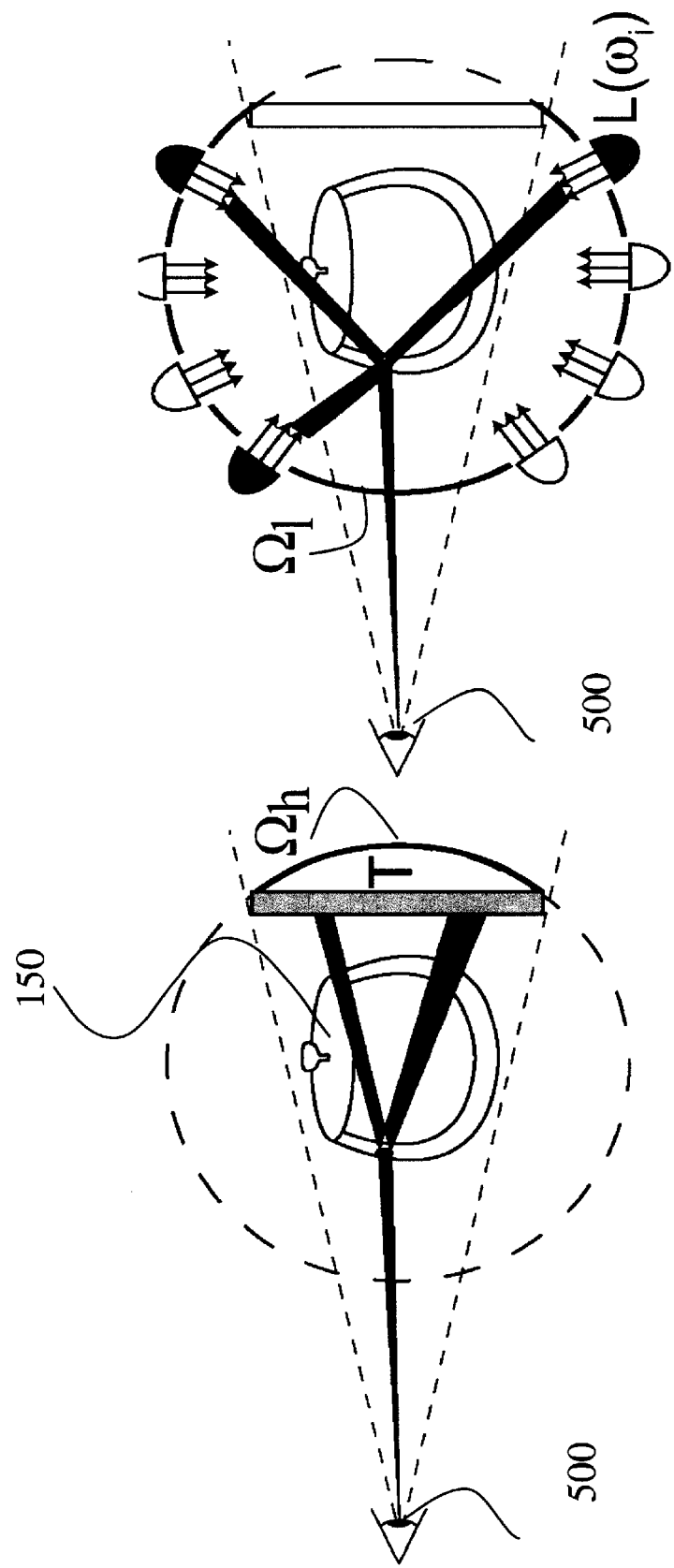
FIGS. 5a–b are schematics of lighting sectors.

Our scanning system 100 provides multiple illumination fields for the environment. As shown in FIG. 5a, the first illumination is with a high-resolution 2D texture map produced by the backlights by displaying a color pattern on the plasma monitors 120–121. The second illumination is by the overhead light array 110 from a sparse set of directions on the remaining hemisphere, as shown in FIG. 5b.

We call the sector of the environment hemisphere covered by the high-resolution texture map—'$\Omega_h$, and the remaining sector covered by the light array—'$\Omega_l$. Furthermore, we make the simplifying assumption that light transport in the sector '$\Omega_h$ can be described by two components.

As shown in FIG. 5a, we are approximating the potentially complicated paths of light through the object by two straight light bundles from the ray-surface intersection to the background monitor. On the other hand, light from one or more directional light sources $L(\omega_i)$ in the sector '$\Omega_l$ is refracted and reflected by the object before arriving at the pixel C 500. Here we assume that the incident light field in the sector '$\Omega_l$ can be sampled at substantially lower resolution than light in the sector '$\Omega_h$ coming directly from behind the object from the high-resolution monitors 120–121.

Thus, the above equation becomes $$C = \int_{\Omega_h} W_h(x) T(x) dx + \int_{\Omega_l} W_l(\omega_i) L(\omega_i) d\omega.$$

We are using a sum of Gaussians to describe $W_h(\chi)$. To find matching Gaussians during k-nearest neighbor interpolation, as described below, we restrict ourselves to a maximum of two Gaussians per surface point. Thus:

$$W_h(x) = a_1 G_1(x, C_1, \sigma_1, \theta_1) + a_2 G_2(x, C_2, \sigma_2, \theta_2).$$

where $G_1$ and $G_2$ are elliptical, oriented 2D unit-Gaussians, and $a_1$ and $a_2$ are their amplitudes, respectively, $\chi$ are the camera pixel coordinates, $C_i$ the center of each Gaussian, $\sigma_i$ are their standard deviations, and $\theta_i$ their orientations, see Chuang et al., "Environment Matting Extensions: Towards Higher Accuracy and Real-Time Capture," *Computer Graphics*, SIGGRAPH 2000 Proceedings, pp. 121–130, 2000, for more details.

Because we are illuminating the sector '$\Omega_l$ with a discrete set of n light sources $L(\omega_i)$ 110, we can rewrite the weighting function $W_h(x)$ as:

$$C = \int_{\Omega_h} (a_1 G_1 T(x) + a_2 G_2 T(x)) dx + \sum_{i=1}^{n} R_i(\omega_i) L_i(\omega_i).$$

We use this equation to model the BSSRDF while rendering according to our invention.

Using the environment matting and reflectance field, we estimate the parameters a and G using observed data C, i.e., pixel values in the images 161–166 from multiple points of view. For each viewpoint, the estimated parameters are stored in an environment matte for $(a_1, G_1, a_2, G_2)$, and n reflection images for $R(\omega_i)$.

When we render according to this model, as described below, we determine the visible surface points on the reconstructed shape S of the object 150. Each visible surface point is reprojected to look up the parameters a, G and R from the k-nearest environment mattes and reflection images. We use unstructured lumigraph interpolation, or view-dependent texture mapping, to interpolate the parameters to any arbitrary new viewpoint. The resulting parameters are then combined using the above equation to determine the color for pixel $C_n$.

This equation is a compromise between high-quality environment matting, as described by Chuang, and our 3D acquisition system 100. In an ideal situation, we would surround the object with high-resolution monitors and acquire the parameters of an arbitrary number of weighting functions W distributed over multiple monitors.

Instead, for practical reasons, we assume that most of the refracted and reflected rays arriving at a pixel originate from the incident light field behind the object. This is true for most objects with a strong reflected component, mostly at grazing angles, and a strong refracted component. It is not necessarily correct for transparent objects with large-scale internal structure or surface facets, such as a crystal chandlier. However, in practice, this approach works reasonably well.

Using a high-resolution environment texture in viewing direction is superior to using only the light array to provide incident illumination. For example, looking straight through an ordinary glass window shows the background in its full resolution. On the other hand, using a high-resolution illumination environment is only feasible with environment matting. The alternative would be to store a very large number of reflection images for each viewpoint, which is impractical. Environment mattes are in essence a very compact representation for high-resolution surface reflectance fields.

It is important to note that, despite the term surface reflectance field, we are capturing a much wider array of effects, including refraction, dispersion, subsurface scattering, and non-uniform material variations. These effects, which are typically costly or impossible to simulate, can be rendered from our model in a reasonable amount of time.

The surface reflectance field is most equivalent to the BSSRDF. The main differences are that we do not know the exact physical location of a ray-surface intersection, and that the incoming direction of light is the same for any point on the surface.

Our model differs from Chuang et al. by restricting the number of incoming ray bundles from the monitors to two, and by replacing the foreground color F in Chuang with a sum over surface reflectance functions $F_i$. The first assumption is valid if reflection and refraction at an object causes view rays to split into two distinct ray bundles that strike the background, see FIG. 5*a*. The second assumption results in a more accurate estimation of how illumination from sector '$\Omega_l$ affects the object's foreground color. By using multiple monitors, we can correctly separate the effects of partial pixel coverage ($\alpha$), and transparency.

By acquiring high- and low-resolution surface reflection images, we can handle high frequency environment maps. The use of environment mattes, an improved interpolation scheme, and improvements in alpha matte acquisition, enables us to acquire and render highly transparent objects.

Opacity Hull Construction

To construct the image-based surface hull on which we parameterize the opacity hull, we extract silhouette images from various view-points. Prior art methods, typically use incandescent or fluorescent "white" lights to acquire silhouette views, see Matusik et al., "Image-Based Visual Hulls," *Computer Graphics*, SIGGRAPH 2000 Proceedings, pp. 369–374, 2000. Backlighting is a common segmentation approach that is often used in commercial two-dimensional machine vision systems. The backlights saturate the image sensor in areas where they are exposed. The silhouette images are then thresholded to establish a binary segmentation for the object. However, binary thresholding is not accurate enough for objects with small silhouette features, such as hair, which we desire to model. It also does not permit sub-pixel accurate compositing of models of the object into realistic scenes.

An additional problem is color spill, see Smith et al, "Blue Screen Matting," *Computer Graphics*, Vol. 30 of SIGGRAPH 96 Proceedings, pp. 259–268. 1996. Color spill is due to the reflection of backlight on the foreground object 150. Color spill typically happens near the edges of object silhouettes because the Fresnel effect increases the secularity of materials near grazing angles. With a single color active backlight, spill is particularly prominent for highly specular surfaces, such as shiny metals or ceramics.

Multi-Color Background Matting

Figure 3:
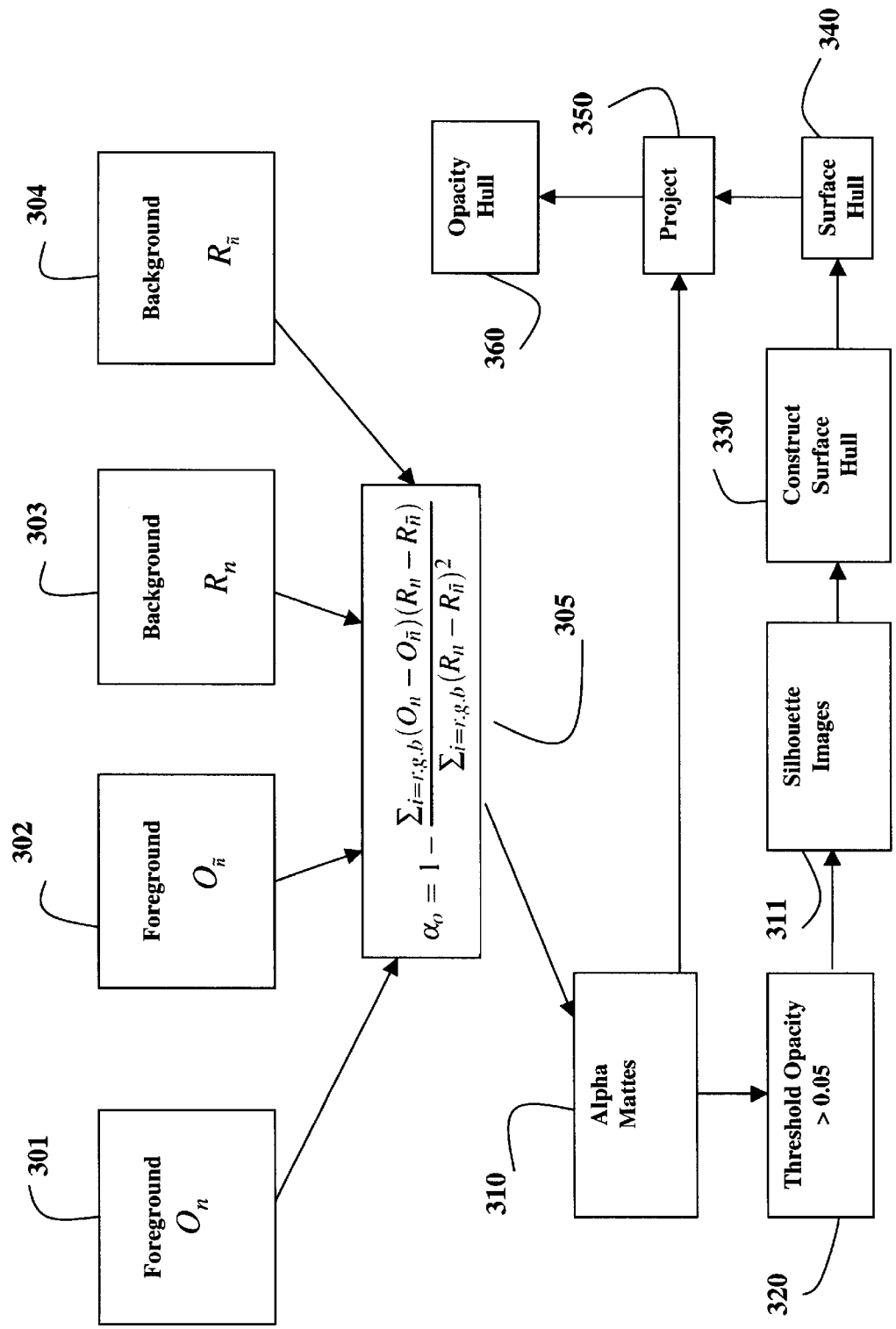
FIG. 3 is a flow diagram of a method for constructing an opacity hull according to the invention.

As shown in FIG. 3, we solve these problems by using use a multi-color background matting technique to acquire alpha mattes 310 of the object 150 from each viewpoint. An accurate alpha matte of the object can be obtained by imaging the object against two backgrounds with different colors. Therefore, we use the color monitors 120–121. The backgrounds differ in color at each pixel.

We use the following sinusoidal color pattern:

$$C_i(x, y, n) = \left(1 + n\sin\left(\frac{2\pi(x+y)}{\lambda} + i\frac{\pi}{3}\right)\right) \times 127, \quad (1)$$

where $C_i(x, y, n)$ is the intensity of color channel i=0, 1, 2 at pixel location (x, y), n is a phase difference, and $\lambda$ is the width of a stripe. To maximize the per-pixel difference between the two backdrops, the patterns are phase shifted by 180 degrees, (n=−1 or +1). The user defines the width of the sinusoidal stripes with the parameter $\lambda$. This pattern minimizes spill effects by providing substantially gray illumination.

The per-pixel alpha $\alpha_O$ is determined 305 using a summing combination over all color channels, RGB in our case, as:

$$\alpha_o = 1 - \frac{\sum_{i=r,g,b}(O_n - O_{\bar{n}})(R_n - R_{\bar{n}})}{\sum_{i=r,g,b}(R_n - R_{\bar{n}})^2}, \quad (2)$$

where $O_n$ 301 and $O_{\bar{n}}$ 302 are per-pixel foreground colors of the object images 163, and $R_n$ 303 and $R_{\bar{n}}$ 304 are per-pixel background colors of the reference images 162.

If we measure the same color at a pixel both with and without the object for each background, Equation (2) equals zero. This corresponds to a pixel that maps straight through from the background to the camera. The phase shifts in the color channels of Equation (1) assures that the denominator of Equation (2) is never zero. The sinusoidal pattern reduces the chance that a pixel color observed due to spill matches the pixel color of the reference image. Nevertheless, it is still possible to observed spill errors for highly specular objects. To reduce these errors we apply the same procedure multiple times, each time varying the wavelength of the backdrop patterns. For the final alpha matte we store the maximum alpha from all intermediate mattes. The overhead of taking the additional images is small, and we need to store only the final alpha matte. This method works very well for a wide variety of objects, including specular and fuzzy materials.

Binary Thresholding

We then construct a surface hull 340 by using the alpha mattes 310 from the various viewpoints. First, we use binary thresholding 320 on the alpha mattes to get binary silhouette images 311. Theoretically, each pixel with $\alpha>0$, i.e., not transparent, is associated with the object 150. In practice, because of noise in the system, remaining spill problems, and slight calibration inaccuracies, we use a slightly higher threshold.

For our high dynamic range images, we find that a threshold of $\alpha>0.05$ yields a segmentation that covers all of the object and parts of the background. This threshold also gives an upper bound on the accuracy of our system, because when opacity values are below this threshold, the object will not be modeled accurately.

However, we encountered one particular problem with very transparent objects. If light is not sufficiently refracted by the object, for example, with very thin glass, then pixels inside the object map straight through to pixels on the background. These pixels are assigned an alpha value of zero, even though they are contained within the object silhouette. This leads to holes in the binary silhouette image.

To correct this problem, we use a simple greedy procedure that fills the holes. A pixel is considered empty when its alpha value is below a threshold $t_a$. We fill regions of empty pixels when the number of connected empty pixels is below a user defined threshold $n_a$. For typical objects, $n_a$ can range from 5 to 100. Pixels inside the silhouette are assigned an alpha value of one.

We assign the originally measured alpha values to pixels along the edges of the binary silhouette. Again, we use a simple greedy procedure. Pixels are considered to be inside the binary silhouette if there are no empty pixels surrounding them in some small neighborhood. We achieve good results with a four-pixel neighborhood. All other pixels are considered to be near the silhouette edge and are assigned the measured alpha values.

The binary silhouettes are then used to construct 330 the image-based surface hull 340. This process also removes improperly classified foreground regions, unless the regions are consistent with all other images. We re-sample the IBVH into a dense set of surface points as described below.

Opacity Hull Construction

The alpha mattes 310 are then projected 350 onto the surface hull 360 to construct the opacity hull 360. To minimize self-occlusion, visibility of each surface point to each image is determined using epipolar geometry. The opacity hull 360 stores opacity values for each surface point.

Alphasphere

The opacity hull stores an alphasphere A for each surface point. If w is an outward pointing direction at a surface point p, then A(p, w) is an opacity value $\alpha_p$ seen from the direction w. Note that the function that defines the alphasphere A should be continuously over the entire sphere. However, any physical system can acquire only a sparse set of discrete samples. We could estimate a parametric function to define each alphasphere A. However, approximating the alphasphere with a parametric function would be very difficult in many cases.

Consequently, as described below, we use k-nearest neighbor interpolation to render the opacity hull from arbitrary viewpoints. It is important to keep in mind that the opacity hull is a view-dependent representation. The opacity hull captures view-dependent partial occupancy of a foreground object with respect to the background.

This intuitively corresponds to the observation that partial occupancy of the object is different for each viewpoint. The view-dependent aspect sets the opacity hull apart from voxel shells, which are frequently used in volume graphics, see Udupa et al., "Shell Rendering," *IEEE Computer Graphics & Applications*, 13(6):58–67, 1993. Voxel shells are not able to accurately represent fine silhouette features, which is an advantage of our opacity hull.

In the prior art, concentric, semi-transparent textured shells have been used to render hair and furry objects, see Lengyel et al., "Real-Time Fur over Arbitrary Surfaces," *Symposium on Interactive 3D Graphics*, pp. 227–232, 2001. They used a geometry called textured fins to improve the appearance of object silhouettes. A single instance of the fin texture is used on all edges of the object.

In contrast, opacity hulls can be looked at as textures with view-dependent opacity values for every surface point of the object. View dependent opacity can be acquired and warped onto any surface geometry (surface hull) that completely encloses the object, i.e., the surface is said to be watertight." For example, the surface hull can also be constructed from accurate geometry acquired from laser range scanning, or it can be acquired by constructing a bounding box geometry. It is important to not the difference between the opacity hull and the particular method that is used to construct the surface hull 340 of the object onto which the opacity hull is projected 350.

With our geometry, opacity hulls can be used to render silhouettes of high complexity.

Similar to constructing the opacity hull, we re-parameterize the acquired radiance images 164 into rays emitted from surface points on the IBVH. This representation is used in our surface reflectance field 251.

Surface light fields were described by Miller et al., "Lazy Decompression of Surface Light Fields for Precomputed Global Illumination," *Proceedings of the 9th Eurographics Workshop on Rendering*, pp. 281–292, 1998, and Wood et al., "Surface Light Fields for 3D Photography," *Computer Graphics*, SIGGRAPH 2000 Proceedings, pp. 287–296, 2000. Their surface light fields were created from a scanned three-dimensional mesh. In contrast, our surface radiance field is created on an opacity hull. Our system replaces multiple scans for geometry and radiance with an automated process that acquires sets of shape and radiance images using the same viewpoints.

The surface radiance images 164 can be used to render the model 180 under a fixed illumination. This places some limitations on the range of applications, because we generate the model with a fixed outgoing radiance function rather than a surface reflectance model.

To address this limitation we also acquire the reflection images 165. Similar to constructing the opacity hull, we re-parameterize the acquired reflection images 165 into rays emitted from surface points on the opacity hull. Debevec et al. described surface reflectance fields. However, they acquire and render them from a single viewpoint. In contrast to their system, we acquire the reflectance field for multiple viewing positions around the object 150.

Under direct illumination, the surface reflectance field 251 is a six dimensional function R. For each surface point $P_r$, the function R maps incoming light directions $w_i$ to reflected color values along a reflected direction $w_r$. Thus, $R=R(P_r, w_i, w_r)$. For each ray through a pixel (x, y) in the reflected direction $w_r$, we observe a reflectance function $R_{xy}(w_i, w_r)$ of the object illuminated from incoming light direction $w_i$. During acquisition, we sample the four-dimensional function $R_{xy}$ from a set of viewpoints $w_r(k)$, and a set of light directions $w_i(l)$.

In prior art reflectance field techniques, the sampling of light directions is dense, e.g., l=64×32, and only for a single viewpoint, i.e., k=1. Instead, we sample the reflectance field from many directions, e.g., k=6×36. To limit the amount of data that we acquire and store, our system can use a sparse sampling of l=4×15 light directions.

We store the data samples of $R_{xy}(k, l)$, as described below. Reconstruction of an image from a new viewing direction $\overline{w}_r$, with new lighting from incoming direction $\overline{w}_i$ is a two pass process. First, we interpolate images under new illumination for all original viewing directions $w_r(k)$. The sample for a pixel at position (x, y) from each of the original viewing directions $w_r$ can be determined for a weighted combination of light sources $L(w_i)$ as follows:

$$L(w_r, x, y) = \sum_{e_i} R_{xy}(w_r, w_i) L(w_i) dA(w_i) \quad (3)$$

where dA is the solid angle covered by each of the original illumination directions dA=sin ϕ, in our case.

After we have constructed images $L(w_r(k))$ for all original viewpoints under novel illumination, we use k-nearest neighborhood interpolation to interpolate the image data to new viewpoints. This is described in more detail below.

An alternative approach is to fit parametric functions for reflectance or BRDFs to the acquired data. This works well for specialized applications. For example, surface reflectance fields of human faces could be acquired, and a parametric function could be fit to the measured reflectance fields. Parametric reflection functions could be fit for arbitrary materials.

As we described below, reflectance functions for points in highly specular, transparent, or self-shadowed areas are very complex and can not easily be approximated using smooth basis functions. We make no assumptions about the reflection property of the material we are imaging.

In order to correctly render transparent material with different indices of refraction, we also acquire the refraction images, or "environment mattes." We re-parameterize the acquired refraction images 166 into rays emitted from surface points on the opacity hull for multiple viewing positions around the object 150, as described above.

Point-Sampled Data Structure

To construct the model, we use an extended point representation based on a layered depth cube (LDC) tree as our shape model on which we parameterize the view-dependent appearance data, see Pfister et al., "Surfels: Surface Elements as Rendering Primitives," *Computer Graphics*, SIGGRAPH 2000 Proceedings, pp. 335–342, 2000, and U.S. Pat. No. 6,396,496 issued to Pfister, et al. on May 28, 2002 entitled "Method for modeling graphical objects represented as surface elements," incorporated herein by reference.

In a pre-processing step, we construct the octree-based LDC tree from the opacity hulls using three orthogonal orthographic projections. The three orthogonal opacity hulls are sampled into layered depth images. The sampling density depends on the complexity of the model, and is user specified. The layered depth images are then merged into a single octree model. Because our opacity hulls are generated from virtual orthographic viewpoints, their registration is exact. This merging also insures that the model is uniformly sampled.

Visibility Vectors

Figure 4:
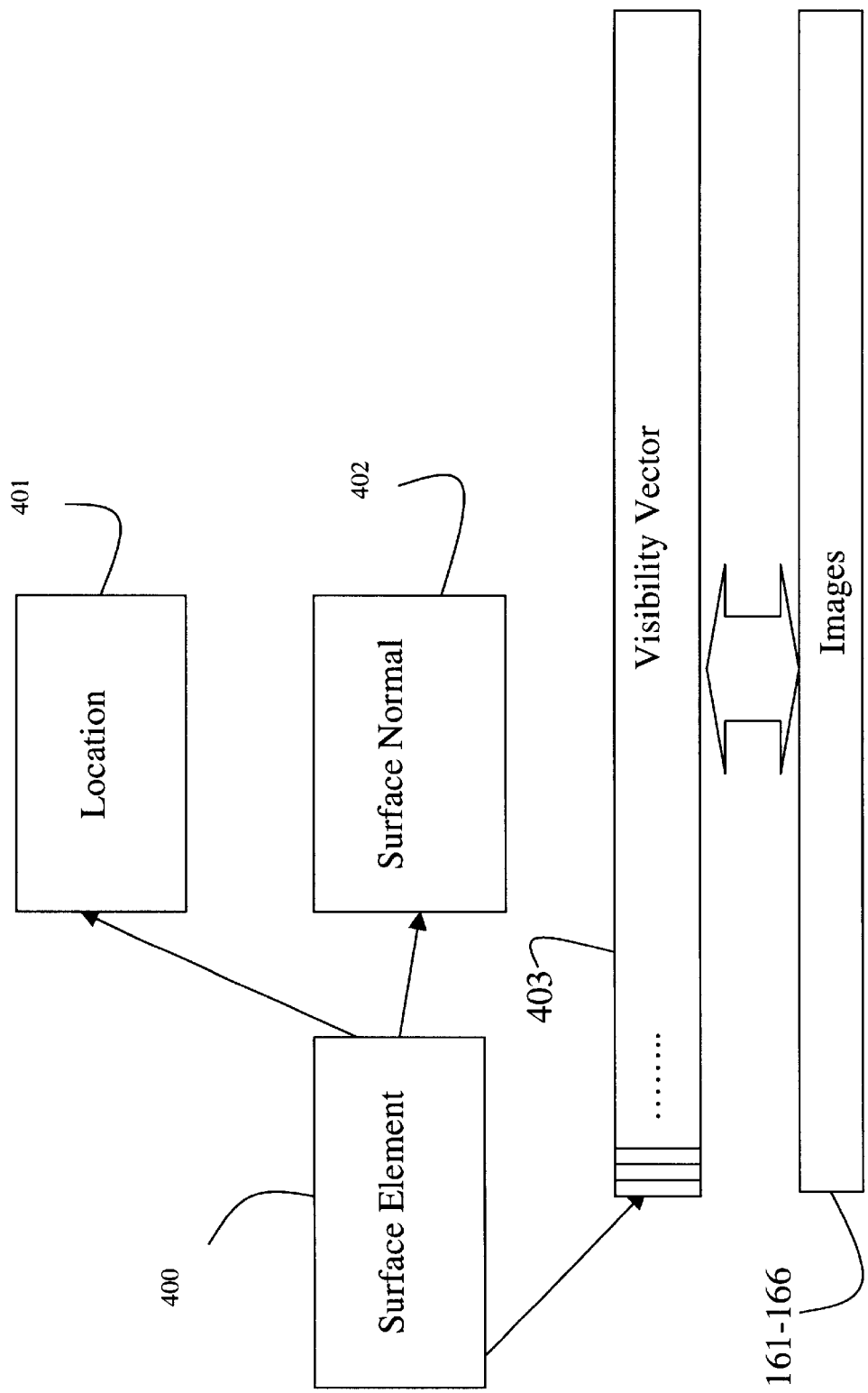
FIG. 4 is a block diagram of a surface element data structure.

As shown in FIG. 4, each surfel (surface element) 400 in the LDC tree stores a location 401, a surface normal value 402, and a camera-visibility bit vector 403. If the surfels have image space resolution, only depth values need to be stored. The visibility vector stores a value of one for each camera position from which the surfel is visible, i.e., set of images 161–166. The bit vector 403 can be computed during opacity hull construction using epipolar geometry.

For each camera position, we store the radiance, reflection, and refraction images associated with that view. The bit vector is then used to determine whether a particular surface element should be rendered or not for a particular view point using the stored images. We render directly from the stored images, with k-nearest neighbor interpolation as needed.

Point samples have several benefits for 3D modeling applications. From a modeling point of view, the point-cloud representation eliminates the need to establish topology or connectivity. This facilitates the fusion of data from multiple sources.

Point samples also avoid the difficult task of computing a consistent parameterization of the surface for texture mapping. We find that point sampled models are able to represent complex organic shapes, such as a Bonsai tree or a feather, more easily than polygonal meshes. In particular, it would be difficult to represent the view-dependent opacity values at each point of the opacity hull using polygonal models and texture mapping.

Image Compression

The raw reflectance image data would require about 76 GB of storage. Storing only the pixel blocks within the object silhouette still would require between 20 and 30 GB, depending on the size of the object. To make this data more manageable, we use a simple compression scheme using principal component analysis (PCA).

The reflectance images are subdivided into 8×8 image blocks. We apply PCA to all the blocks corresponding to the same viewpoint and varying illumination. We set a global threshold for the RMS reconstruction error. Each block is then stored as a variable number of eigenvalues and principal components. The average number of principal components is typically four to five per block, when we set the global RMS reconstruction error to be within 1% of the average radiance values of all reflectance images. PCA analysis typically reduces the amount of reflectance data by a factor of ten.

Rendering

To render our point-sampled models we use a high quality EWA surface splatting approach, see Zwicker et al., "Surface Splatting," *Computer Graphics*, SIGGRAPH 2001 Proceedings, 2001, and U.S. patent application Ser. No. 09/514,545 filed by Zwicker et al., on Feb. 28, 2000, entitled "Visibility Splatting and Image Reconstruction for Surface Elements," all incorporated herein by reference.

We render the opacity hull models using the elliptical weighted average (EWA) surface splatting. A hierarchical forward-warping process projects the surface points to screen space, where the EWA filter reconstructs the image. The modified A-buffer provides order-independent transparency blending and edge anti-aliasing.

Most of the rendering time is spent on computing the color (C) for each point on the object surface. We start with a new environment map $\tilde{T}$, described below. For example, the map can be a spherical high-dynamic range light probe image of a natural scene. We first reconstruct new reflection images from the original viewpoints for this new illumination environment. Then we project the 2D Gaussians of the original environment mattes into the new environment map. Note the difference between environment "mattes" and "maps." To interpolate the alpha mattes, reflection images, and environment mattes to new viewpoints, we use unstructured lumigraph interpolation. The interpolated values are then used to evaluate the equation $$C = \int_{\Omega_h} (a_1 G_1 T(x) + a_2 G_2 T(x)) dx + \sum_{i=1}^{n} R_i(\omega_i) L_i(\omega_i).$$

First, we generate new images from the surface reflectance field data 251 that show the object under the new light configuration. The new light colors and directions are specified by a low-resolution version of the environment map $\tilde{T}$. This low-resolution map must match the resolution of light positions in $'\Omega_l$.

In our case, it contains 4×11 pixels. For each viewpoint, we have a set of 8×8 reflectance blocks. Each block R is compressed using PCA analysis into:

$$R = \sum_{i=1}^{k} \lambda_i V_i,$$

where 65 $_i$ are the k eigenvalues we store for each block. and Vi are its principal components. Given a new set of m directional lights $\tilde{L}_i$, we can compute the new colors for the pixels C of the block directly as a linear combination of the coefficients of the PCA basis:

$$C = \sum_{i=1}^{m} \left( \tilde{L}_i \sum_{j=1}^{k} \lambda_i V_i \right).$$

This direct computation avoids reconstruction of the reflectance data from the PCA basis. Note that we convert a set of reflection images for each viewpoint into one radiance image that shows the object under the new illumination. This computation is performed for each change of the environment map.

Environment Matte Projection

Figure 6:
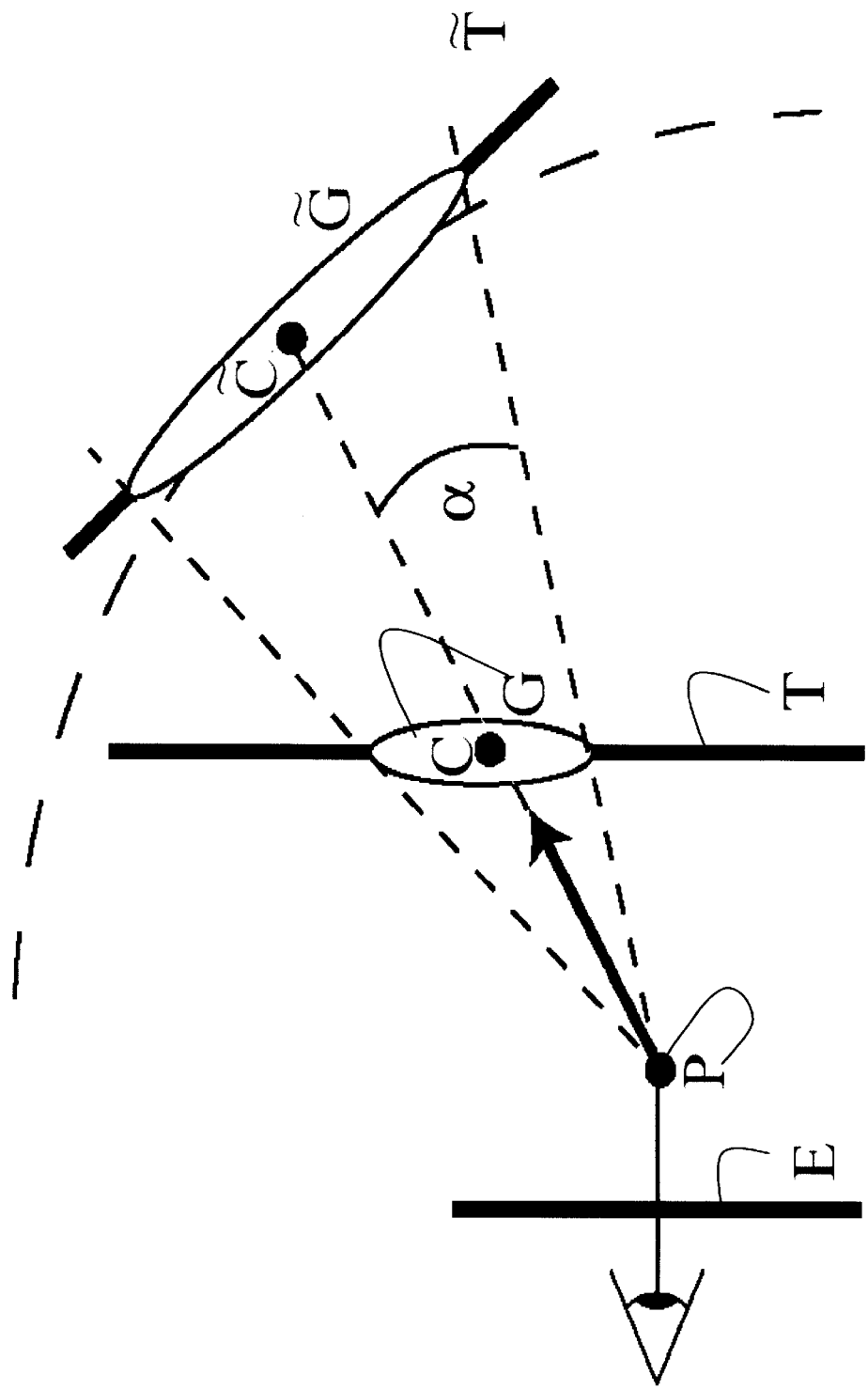
FIG. 6 is a schematic of a reprojection of a Gaussian environment matte.

Our acquired environment mattes are parameterized on a plane T of the background monitor 120. However, for rendering, the mattes need to be parameterized on the global environment map $\tilde{T}$. FIG. 6 shows a 2D drawing of the situation. During system calibration we determine the position of each monitor plane T with respect to each viewpoint. This information is globally stored per viewpoint. The map $\tilde{T}$ is the parameterization plane of the new environment map. The mapping from T to $\tilde{T}$ can be non-linear, for example, for spherical environment maps.

A 3D surface point P on the object is projected onto a pixel of the environment matte E, which stores the parameters of the 2D Gaussian G. We compute the Gaussian $\tilde{G}$ that best approximates the projected Gaussian G on the parameterized surface $\tilde{T}$. We represent the new Gaussian $\tilde{G}$ using the following parameters: a the amplitude of G, $\tilde{C}$ a 3D direction vector, ($\alpha$, $\beta$) the opening angles), and $\theta$ the new rotation angle. This projection is performed for each change of the environment map.

Alpha and Radiance Interpolation

For each surface point, we compute the k-nearest (k=4) visible viewpoints using the point's position and the global camera parameters. As described above, visibility is determined during opacity hull construction and stored in the visibility vector. We compute the interpolation weights $w_i$ for the four closest viewpoints according to unstructured lumigraph interpolation. The weights ensure continuous transitions between camera views and epipole consistency, i.e., rendering the object from original camera viewpoints exactly reproduces the original images.

Using the global camera parameters, each surface point is then projected into its four closest alpha mattes, reflection images, and environment mattes. We use the interpolation weights $w_i$ to interpolate the view-dependent alpha from the alpha mattes and the color radiance values from the reconstructed reflection images.

Environment Matte Interpolation

To compute the radiance contribution from the environment mattes involves two steps: interpolating new Gaussians $\hat{G}$, and convolving the new Gaussians with the environment map to compute the resulting colors. We first interpolate the parameters of k=4 reprojected Gaussians $\hat{G}_i$. Using $w_i$, we compute linear combinations for the amplitudes $a_i$, and the directional vectors $\tilde{C}_i$. The angular parameters ($\alpha$, $\beta$) and $\theta$ are blended using quaternion interpolation. The result is the new Gaussian $\tilde{G}$ that is an interpolated version of the Gaussians $\hat{G}$, morphed to the new viewpoint. Note that this interpolation needs to be performed on matching Gaussians from the environment mattes.

Figure 7:
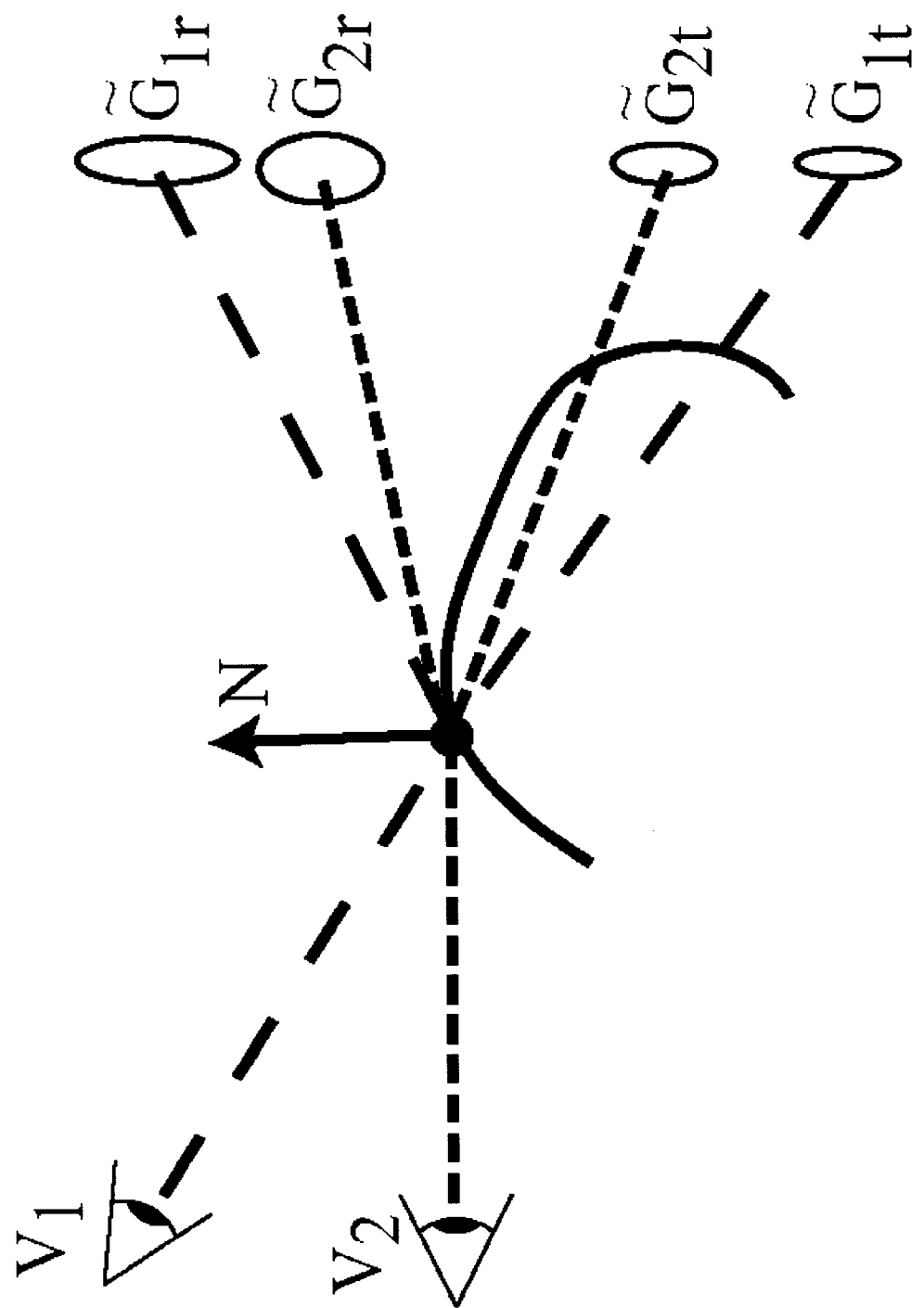
FIG. 7 is a schematic of matching reflective and refractive Gaussians.

FIG. 7 shows a simplified ID drawing of the matching process. We are only storing two Gaussians $G_i$ per environment matte pixel, where each pixel corresponds to a viewpoint ray $V_i$ in FIG. 7. The two Gaussians per pixel are classified as reflective ($\hat{G}_{i r}$) or transmissive ($\hat{G}_{i t}$). We compute the direction, i.e., angle $\Phi$, of their center vectors $\hat{G}_{i r}$ and $\hat{G}_{i t}$ with the surface normal N. If $\Phi > 90°$, then we classify the Gaussian as transmissive. Otherwise, we classify it as reflective. If both Gaussians are reflective or refractive, then we only store the one with the larger amplitude a This computation has to be performed for each change of the environment map, after computing the reprojected Gaussians $\tilde{G}$.

During interpolation, we match up refractive and reflective Gaussians. In other words, new Gaussians $\tilde{G}_{i r}$ and $\tilde{G}_{i t}$ are interpolated from $\hat{G}_{i r}$ and $\hat{G}_{i t}$, respectively. Note that this matching would be much more difficult if we had stored more than two Gaussians per environment matte pixel, as described by Chuang et al.

To compute the color C" for each viewing ray from the interpolated environment mattes we use:

$$C'' = a_r(\tilde{G}_r \otimes \tilde{T}) + a_t(\tilde{G}_t \otimes \tilde{T}).$$

where ⊗ (denotes convolution. The final pixel color C, according to our modeling equation is the sum of the low-resolution reflectance field color C' and the high-resolution reflectance field color C".

Effect of the Invention

We have described a 3D modeling system optimized for the generation of high quality renderings of objects constructed of arbitrary materials and illuminated by arbitrary lighting. The basic premise of our imaging approach is to use large amounts of radiance information to produce accurate renderings of the object instead of relying on accurate geometry. Unlike prior art scanners, our system reliably acquires and renders models of objects with fuzzy, transparent, translucent, and highly reflective surfaces.

Using surface reflectance fields, our system is the first to render objects with shape and materials of arbitrary complexity under varying illumination from new viewpoints. Furthermore, the use of surface refraction fields allows us to correctly render transparent portions of objects with various refractive properties.

The system is fully automated and is easy to use. We have provided an opacity hull, a new shape representation that stores view-dependent opacity parameterized on the surface hull of the object. We use the same image set to construct the opacity hull and to represent surface radiance and reflectance. This avoids any registration inaccuracies and has proven to be extremely robust. The opacity hull and a dense set of radiance data remove the requirement of accurate 3D geometry for rendering of objects.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for modeling a three-dimensional object, comprising:

acquiring, for each of a plurality of viewpoints, a plurality of sets of images of the object, each of the plurality of sets of images for each viewpoint having different lighting;

acquiring an opacity hull of the object, the opacity hull completely enclosing the object, the opacity hull being a view-dependent opacity parameterization of the object, and the opacity hull storing opacity values for each surface point of a surface hull of the object; and projecting the plurality of sets of images onto the opacity hull to render the object under arbitrary llighting conditions for arbitrary viewpoints.

2. The method of claim 1 further comprising:

interpolating lighting values of the plurality of sets of images during the projection.

3. The method of claim 1 wherein the opacity hull is modeled by surface points, and further comprising:

storing a bit vector for each surface point, the bit vector having one bit for each image in which the point is visible.

4. The method of claim 3 further comprising:

using the bit vector to determine visible images for each surface point;

interpolating the visible images for each surface point; and generating an output image using the interpolated image data.

5. The method of claim 1 further comprising:

rotating the object while acquiring the plurality of sets of images.

6. The method of claim 5 further comprising:

rotating a plurality of overhead lights as an array while acquiring the plurality of sets of images.

7. The method of claim 1 further comprising:

acquiring a low-resolution surface reflectance field with a plurality of overhead lights;

acquiring a high-resolution surface reflectance field with a plurality of backlights.

\* \* \* \* \*